A. H. BRYANT.

EGG BOX.

No. 7,257. Reissued Aug. 8. 1876.

Attest:
H. L. Pierce,
W. E. Schaffer

Inventor:
Abner H. Bryant,
By L. C. Somers
Attorney.

N. PETERS, PHOTO-LITHOGRAPHER, WASHINGTON, D. C.

UNITED STATES PATENT OFFICE.

ABNER H. BRYANT, OF CHICAGO, ILL., ASSIGNOR, BY MESNE ASSIGNMENTS, TO HENRY F. BILLINGS AND CHARLES E. COBURN, OF SAME PLACE.

IMPROVEMENT IN EGG-BOXES.

Specification forming part of Letters Patent No. 158,828, dated January 19, 1875; reissue No. 7,257, dated August 8, 1876; application filed February 9, 1876.

*To all whom it may concern:*

Be it known that I, ABNER H. BRYANT, of the city of Chicago, in the county of Cook and State of Illinois, have invented a new and useful Improvement in Egg-Carriers; and I do hereby declare the following is a full, clear, and exact description of the construction and operation of the same, reference being had to the annexed drawings, making a part of this specification, and to the letters and figures of reference marked thereon.

Figure 1:
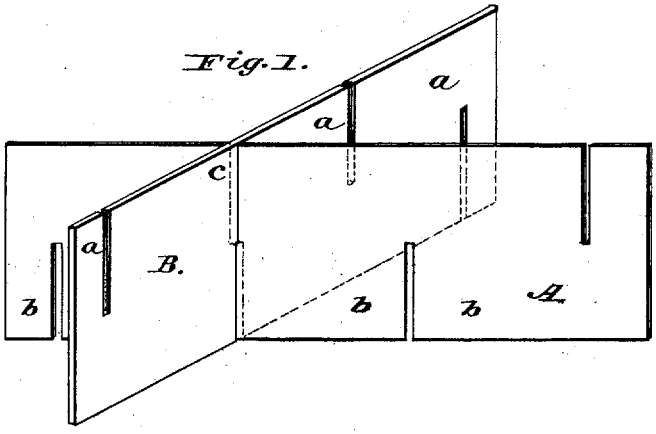
Figure 2:
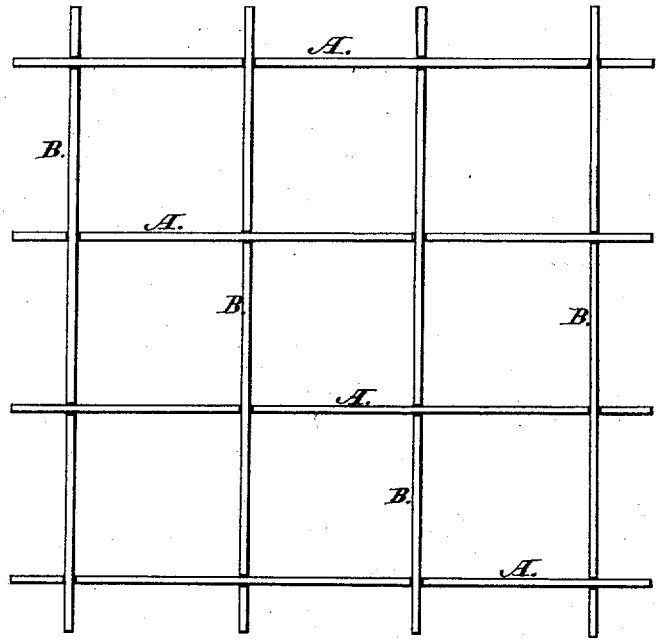

Figure 1 of the drawing is a representation of a detail view of my egg-carrier. Fig. 2 is a top view of the same.

This invention has relation to the construction of egg-carriers by intersecting strips of pasteboard or similar material to form the side walls of the pockets.

Heretofore rectangular egg-pockets have been made with strips having slits on one side only; but these strips are objectionable in use for the reason that in handling they fall apart too easily.

My improvement consists in the construction and novel arrangement of interlacing slits or notches in such a manner that they extend inwardly alternately from each edge of both the longitudinal and transverse strips, whereby the strips are adapted to be interwoven together, and thus locked, thereby preventing all liability of damage to the eggs by the falling apart of the slips.

In the accompanying drawing, the letter A designates one strip, which, for convenience, will be termed the longitudinal strip, B indicating the other or transverse strip. Each of these strips is provided with the interlacing slits *a* and *b*, respectively, extending alternately from the upper and lower edges of the strip inward, as indicated in Fig. 1 of the drawings, in such a manner that the strips may be interwoven by means of the slips.

In this operation the flexible nature of the material of which the strips are formed enables them to be bent sufficiently to pass the corresponding alternate blank *c* of one strip into the alternate slits of each edge of the cross-strips. When this is done the strip A will be prevented from moving in either direction with reference to the strips B by the slits of the latter embracing and locking its upper as well as its lower edge in position. In the same manner each strip B is locked on both edges by the slits of the crossing strips A.

I do not claim a tray of rectangular pockets, composed of a single strip of paper or other flexible material, having slots formed alternately upon opposite sides of the strip.

Moreover, I am well aware that a strip with an alternating or reverse slot on opposite sides thereof is not new, and, therefore, I do not claim, broadly, such strips or the reverse slot; but

What I claim as new, and desire to secure by Letters Patent, is—

1. A tray or double series of rectangular bottomless pockets, constructed of flexible material, in separate strips, interwoven and permanently interlocked, beyond danger of separation, by means of straight slits or slots cut in opposite edges thereof, substantially as and for the purpose set forth.

2. A tray or double series of rectangular bottomless pockets, constructed of suitable flexible material, in two intersecting series of separate strips, each series of strips being provided with slots or slits cut in opposite edges of each strip, whereby the respective series are interwoven and permanently interlocked beyond danger of separation, substantially as and for the purpose set forth.

3. A tray or double series of rectangular bottomless pockets, constructed of suitable flexible material, in two intersecting series of separate strips, each series of strips being provided with slots or slits cut alternately in opposite edges of each strip, whereby the respective series are interwoven and permanently interlocked beyond danger of separation, substantially as and for the purpose set forth.

In testimony that I claim the above I have hereto subscribed my name in the presence of two witnesses.

ABNER H. BRYANT.

Witnesses:

WILLIAM H. OVINGTON,
GEO. W. FULLER.